US008269992B2

(12) United States Patent
Kawasaki

(10) Patent No.: US 8,269,992 B2
(45) Date of Patent: Sep. 18, 2012

(54) INFORMATION PROCESSING APPARATUS AND CONTROL METHOD THEREOF

(75) Inventor: Keiji Kawasaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 646 days.

(21) Appl. No.: 12/198,543

(22) Filed: Aug. 26, 2008

(65) Prior Publication Data

US 2009/0059247 A1 Mar. 5, 2009

(30) Foreign Application Priority Data

Aug. 31, 2007 (JP) ................................. 2007-226695

(51) Int. Cl.
*G06F 3/12* (2006.01)
(52) U.S. Cl. ........ 358/1.13; 358/1.8; 358/1.9; 358/1.16; 358/3.21
(58) Field of Classification Search .................. 358/1.15, 358/1.13, 3.26, 538, 1.8, 1.9, 1.16, 3.21, 358/1.12
See application file for complete search history.

(56) References Cited

U.S. PATENT DOCUMENTS

| 7,054,029 | B1 | 5/2006 | Ohta et al. | |
|---|---|---|---|---|
| 7,281,789 | B2 * | 10/2007 | Goto et al. | 347/100 |
| 7,336,380 | B2 * | 2/2008 | Eisele | 358/1.15 |
| 2002/0046101 | A1 | 4/2002 | Ogawa et al. | |
| 2003/0151642 | A1 * | 8/2003 | Kaneko | 347/43 |
| 2006/0087698 | A1 * | 4/2006 | Allen | 358/3.26 |
| 2007/0019259 | A1 * | 1/2007 | Lee | 358/538 |
| 2007/0070376 | A1 | 3/2007 | Owen et al. | |
| 2007/0103495 | A1 * | 5/2007 | Niekawa et al. | 347/9 |
| 2007/0229888 | A1 * | 10/2007 | Matsui | 358/1.15 |
| 2008/0100660 | A1 * | 5/2008 | Perrin et al. | 347/28 |

FOREIGN PATENT DOCUMENTS

| JP | 9052390 A | 2/1997 |
|---|---|---|
| JP | 9269874 A | 10/1997 |
| JP | 10-207664 | 8/1998 |
| JP | 2001-038970 A | 1/2001 |
| JP | 2001-186356 A | 7/2001 |
| JP | 2002-032207 A | 1/2002 |
| JP | 2006-159648 A | 6/2006 |
| JP | 2007-087392 A | 4/2007 |
| JP | 2007-110226 A | 4/2007 |

OTHER PUBLICATIONS

English Machine Translation of JP H10-207664 A (Yoshinobu, published Aug. 7, 1998).*
Japanese Office Action—Patent Appln. No. 2007-226695 mailed Feb. 24, 2012, from Japanese Patent Office.

* cited by examiner

*Primary Examiner* — Benny Q Tieu
*Assistant Examiner* — Juan Guillermety
(74) *Attorney, Agent, or Firm* — Fitzpatrick, Cella, Harper & Scinto

(57) ABSTRACT

There is provided an image processing apparatus that generates print data for printing by an inkjet printing apparatus, based on a rendering command group that includes a rendering command for a vector image, comprising: a determination unit which determines, for each rendering command included in the rendering command group, whether ink having a predetermined property is to be used; a rendering unit which renders in a first memory a raster image corresponding to a rendering command for ink having the predetermined property is to be used, and renders in a second memory a raster image corresponding to a rendering command for ink having the predetermined property is not to be used; a lossy compression unit which lossily compresses the raster image in the first memory; and a generation unit which generates print data that includes the raster image in the first memory and the raster image in the second memory.

14 Claims, 9 Drawing Sheets

FIG. 4

| MEDIA | DUPLEX PRINTING | BORDERLESS PRINTING | PRINT QUALITY | | |
|---|---|---|---|---|---|
| | | | FAST | NORMAL | FINE |
| PLAIN PAPER | SIMPLEX | BORDER | TRUE | TRUE | FALSE |
| | | BORDERLESS | TRUE | TRUE | FALSE |
| | DUPLEX | BORDER | TRUE | FALSE | FALSE |
| | | BORDERLESS | FALSE | FALSE | FALSE |
| GLOSSY PAPER 1 | SIMPLEX/DUPLEX | BORDER/BORDERLESS | / | FALSE | FALSE |
| GLOSSY PAPER 2 | SIMPLEX/DUPLEX | BORDER/BORDERLESS | / | FALSE | FALSE |

INFORMATION PROCESSING APPARATUS AND CONTROL METHOD THEREOF

BACKGROUND OF THE INVENTION

1. Field of the Invention

The present invention relates to an information processing apparatus that generates print data for printing by an inkjet printing apparatus, and a control method thereof.

2. Description of the Related Art

Heretofore, a printing system is known in which print data is generated in a host computer such as a personal computer (PC), and the generated print data is output to a printer and printed to a printing medium such as paper by the printer.

Also, a method in a printing system is known that involves compressing print data to be output from the host computer to a printer, and transmitting the compressed print data. As an example, the host computer outputs print data to the printer after reducing the data size thereof by lossily compressing raster image data included in the print data using JPEG encoding or the like. The printer prints the received print data after decompressing the lossily compressed raster image data included in the print data. Print data is transferred from the host computer to the printer at high speed when the data size of the print data is reduced, thereby speeding up the printing process in the printing system.

When image data is lossily compressed using JPEG encoding or the like, the high-frequency component of the image data is lost and image quality deteriorates. Therefore, deterioration in image quality is particularly severe in parts of the image that include a large amount of high-frequency component, such as characters and simple graphics, for example.

In contrast, a technique is known that involves separately rasterizing tonality-oriented image data and resolution-oriented image data, and compressing the former with emphasis on tonality and the latter with emphasis on resolution (see Japanese Patent Laid-Open No. 10-207664).

Many inkjet printers that print by discharging ink are provided with a plurality of inks with different properties, so as to be able to appropriately print various images with different characteristics, such as character images and photo images, to various printing media.

One of the ink properties is permeability to the printing medium. With low permeability ink, a considerable amount of ink remains on the surface of the printing medium. Therefore, advantages include high density and being able to print a sharp image. On the other hand, with low permeability ink, the rate of permeability to the printing medium is slow, increasing the time required for the ink remaining on the surface of the printing medium to fix. As a result, if another ink droplet adheres to an adjacent position, a reaction occurs at the boundary of both inks, causing deterioration in print quality. One such phenomenon is called bleeding, which occurs as a result of differences in permeability between inks or differences in surface tension.

Given the aforementioned advantages, low permeability ink is generally used in printing black characters which require high visibility and vividness. Therefore, there are inkjet printers that have low permeability black pigment ink for printing black characters, and high permeability color dye ink for printing other images.

With such inkjet printers, bleeding occurs at the boundary between the ink droplets of these inks, since both black pigment ink and color dye ink are used on a single printing medium. Particularly, if dye ink contaminates a character printed with pigment ink, the visibility and vividness of the character is greatly reduced, detracting from the advantages of using low permeability ink. Hereinafter, the phenomenon where dye ink contaminates a character printed with pigment ink will be described with reference to FIG. 2.

A raster image 200 has been obtained by an inkjet printer decompressing image data lossily compressed by a host computer. An enlarged image 205 is an enlarged image of part of the raster image 200.

In the enlarged image 205, an area 201 is to be printed using color dye ink. An area 202, which is part of the black character "t", is to be printed with black pigment ink. The boundary between the character and the background image is normally a high-frequency area, with noise readily occurring when this area is lossily compressed using JPEG encoding or the like. Noise 203 and noise 204 show in simplified form the noise that has occurred.

The noise 203, showing noise that occurs outside the character area (area 202), is an intermediate color between black and the background color. Such noise 203, not normally being completely black, is printed using color dye ink during printing. Therefore, deterioration in print quality due to bleeding does not readily occur in the area 201 printed with high permeability color dye ink, because the same color dye ink is used in printing, despite being printed as noise.

On the other hand, the noise 204 that occurs inside the character area (area 202), similarly not being completely black, is printed with color dye ink. That is, the noise 204 is printed with high permeability color dye ink inside the area 202 printed with low permeability black pigment ink. As a result, there will be patches printed with inks of differing permeability in a small area (area 202, noise 204), causing severe deterioration in print quality due to bleeding. Specifically, the black pigment ink blurs around the outline of the character, and the character outline loses its vividness.

Deterioration in print quality due to raster image data being lossily compressed is thus closely related to the properties of the inks used during printing. In other words, the effect on print quality differs greatly depending on the properties of the inks used during printing, even with comparable noise produced by lossy conversion.

However, while conventional techniques such as Japanese Patent Laid-Open No. 10-207664 take into consideration mitigating noise that generally occurs readily during lossy conversion, deterioration in print quality with the use of inks having different properties is not taken into consideration.

SUMMARY OF THE INVENTION

The present invention has been made in consideration of the above situation, and has as its feature to provide a technique for suppressing deterioration in print quality with the use of inks having different properties during printing, in an information processing apparatus that generates print data for printing by an inkjet printer.

According to an aspect of the present invention, there is provided an image processing apparatus that generates print data for printing by an inkjet printing apparatus, based on a rendering command group that includes a rendering command for a vector image, comprising:

a determination unit which determines, for each rendering command included in the rendering command group, whether ink having a predetermined property is to be used, in order for the printing apparatus to print a corresponding raster image to a printing medium;

a rendering unit which renders in a first memory a raster image corresponding to a rendering command for which it is determined by the determination unit that ink having the predetermined property is to be used, and renders in a second memory a raster image corresponding to a rendering command for which it is determined by the determination unit that ink having the predetermined property is not to be used, with the raster image in the first memory and the raster image in the second memory being used for printing an area to be printed using a same scan of a printhead of the printing apparatus;

a lossy compression unit which lossily compresses the raster image in the first memory; and a generation unit which generates print data that includes the raster image in the first memory lossily compressed by the lossy compression unit, and the raster image in the second memory.

According to another aspect of the present invention, there is provided a control method of an image processing apparatus that generates print data for printing by an inkjet printing apparatus, based on a rendering command group that includes a rendering command for a vector image, comprising:

determining, for each rendering command included in the rendering command group, whether ink having a predetermined property is to be used, in order for the printing apparatus to print a corresponding raster image to a printing medium;

rendering in a first memory a raster image corresponding to a rendering command for which it is determined in the determination that ink having the predetermined property is to be used, and rendering in a second memory a raster image corresponding to a rendering command for which it is determined in the determination that ink having the predetermined property is not to be used, with the raster image in the first memory and the raster image in the second memory being used for printing an area to be printed using a same scan of a printhead of the printing apparatus;

lossily compressing the raster image in the first memory; and generating print data that includes the raster image in the first memory lossily compressed in the lossyily compressing, and the raster image in the second memory.

According to yet another aspect of the present invention, there is provided a computer program, stored on a computer-readable storage medium, for causing an image processing apparatus that generates print data for printing by an inkjet printing apparatus, based on a rendering command group that includes a rendering command for a vector image, to function as:

a determination unit which determines, for each rendering command included in the rendering command group, whether ink having a predetermined property is to be used, in order for the printing apparatus to print a corresponding raster image to a printing medium;

a rendering unit which renders in a first memory a raster image corresponding to a rendering command for which it is determined by the determination unit that ink having the predetermined property is to be used, and renders in a second memory a raster image corresponding to a rendering command for which it is determined by the determination unit that ink having the predetermined property is not to be used, with the raster image in the first memory and the raster image in the second memory being used for printing an area to be printed using a same scan of a printhead of the printing apparatus;

a lossy compression unit which lossily compresses the raster image in the first memory; and a generation unit which generates print data that includes the raster image in the first memory lossily compressed by the lossy compression unit, and the raster image in the second memory.

Further features of the present invention will become apparent from the following description of exemplary embodiments with reference to the attached drawings.

BRIEF DESCRIPTION OF THE DRAWINGS

FIG. 4 is a lookup table which registers, for each print mode, whether black pigment ink is to be used in printing a black image.

DESCRIPTION OF THE EMBODIMENTS

Preferred embodiments of the present invention will now be described with reference to the attached drawings. Each embodiment described below will be helpful in understanding a variety of concepts from the generic to the more specific.

It should be noted that the technical scope of the present invention is defined by the claims, and is not limited by each embodiment described below. In addition, not all combinations of the features described in the embodiments are necessarily required for realizing the present invention.

In the following embodiments, configurations for suppressing bleeding that occurs at the boundary between black pigment ink and color dye ink will be described. Bleeding is, however, caused by differences in the properties (e.g., permeability) of inks, and is not limited to the combination of pigment and dye inks or the combination of black and color inks.

First Embodiment

Figure 8:
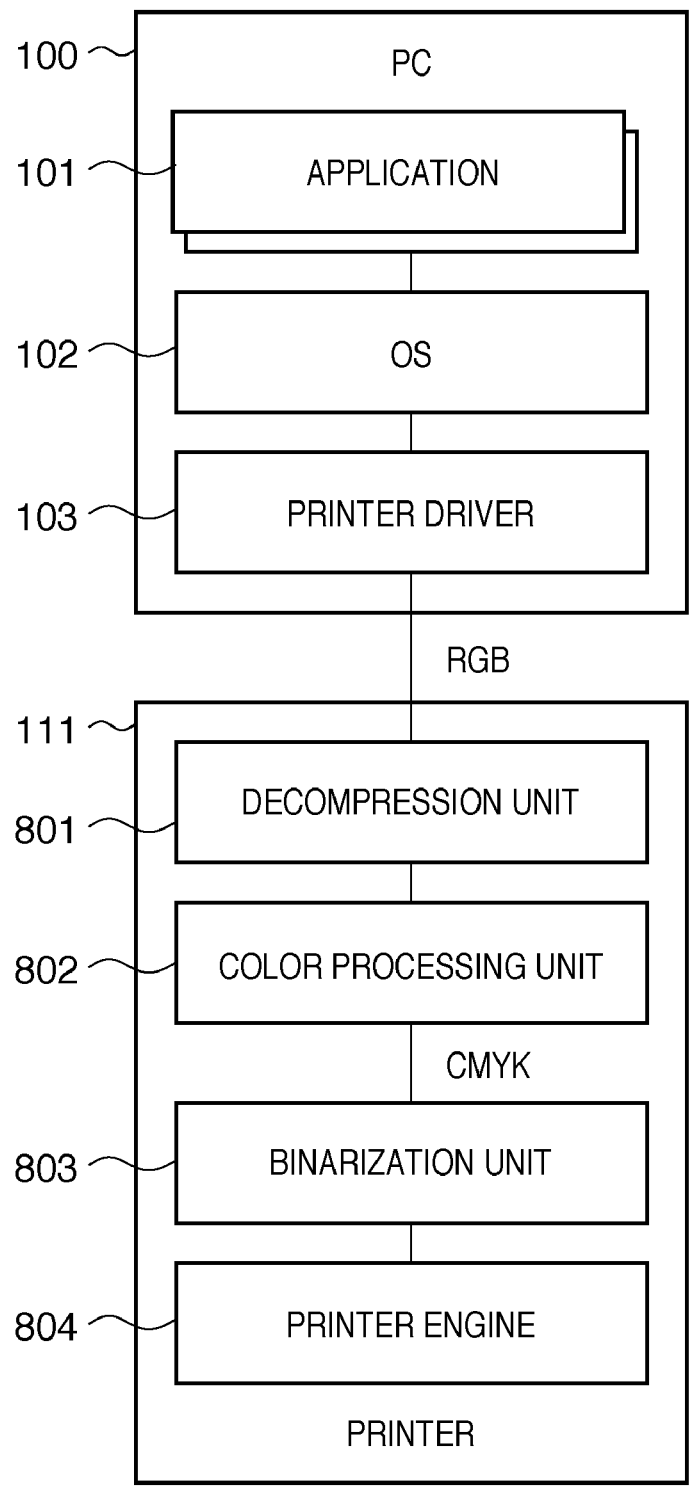
FIG. 8 is a block diagram showing the configuration of a printing system according to the first embodiment.

FIG. 8 is a block diagram showing the configuration of a printing system 800 according to a first embodiment. The printing system 800 includes a personal computer (PC) 100 constituting an exemplary information processing apparatus that applies the present invention, and a printer 111 constituting an inkjet printing apparatus, which are communicably connected with a USB cable or the like.

The PC 100 includes an application 101, an operating system (OS) 102, and a printer driver 103, which are realized by software.

The application 101 is a word processor, a web browser or the like, and generates image data for printing. Image data for printing includes text data such as characters, graphics data such as graphics, and bitmap data such as photos. The application 101 executes a printing operation based on a document being edited or a webpage being browsed, in accordance with a user instruction. Specifically, the application 101 issues a print request and a rendering command group to the OS 102.

The OS 102 receives the print request and the rendering command group from the application 101, and issues the print request and the rendering command group to the printer driver 103 corresponding to the printer 111. The OS 102 is able to spool print requests and rendering command groups issued by a plurality of applications including the application 101. The OS 102 is, for example, a Windows® OS.

The printer driver 103 generates raster image data based on the print request and the rendering command group issued by the OS 102. The printer driver 103 lossily compresses the raster image data, although in the present embodiment, not all of the raster image data is lossily compressed (detailed below). The printer driver 103 appends commands or the like required for processing by the printer 111, generates print data that the printer 111 can use for printing, and outputs the generated print data to the printer 111. Note that normally, at this stage, raster image data is multi-value image data represented in RGB color space.

The printer 111 includes a decompression unit 801, a color processing unit 802, a binarization unit 803, and a printer engine 804.

The decompression unit 801 decompresses raster image data included in print data received from the PC 100. The color processing unit 802 performs various color processing on the decompressed raster image data and converts the raster image data to multi-value image data represented in CMYK color space. The binarization unit 803 binarizes the multi-value image data by performing half-tone processing or the like thereon. The printer engine 804 performs printing based on the binarized image data.

Figure 9:
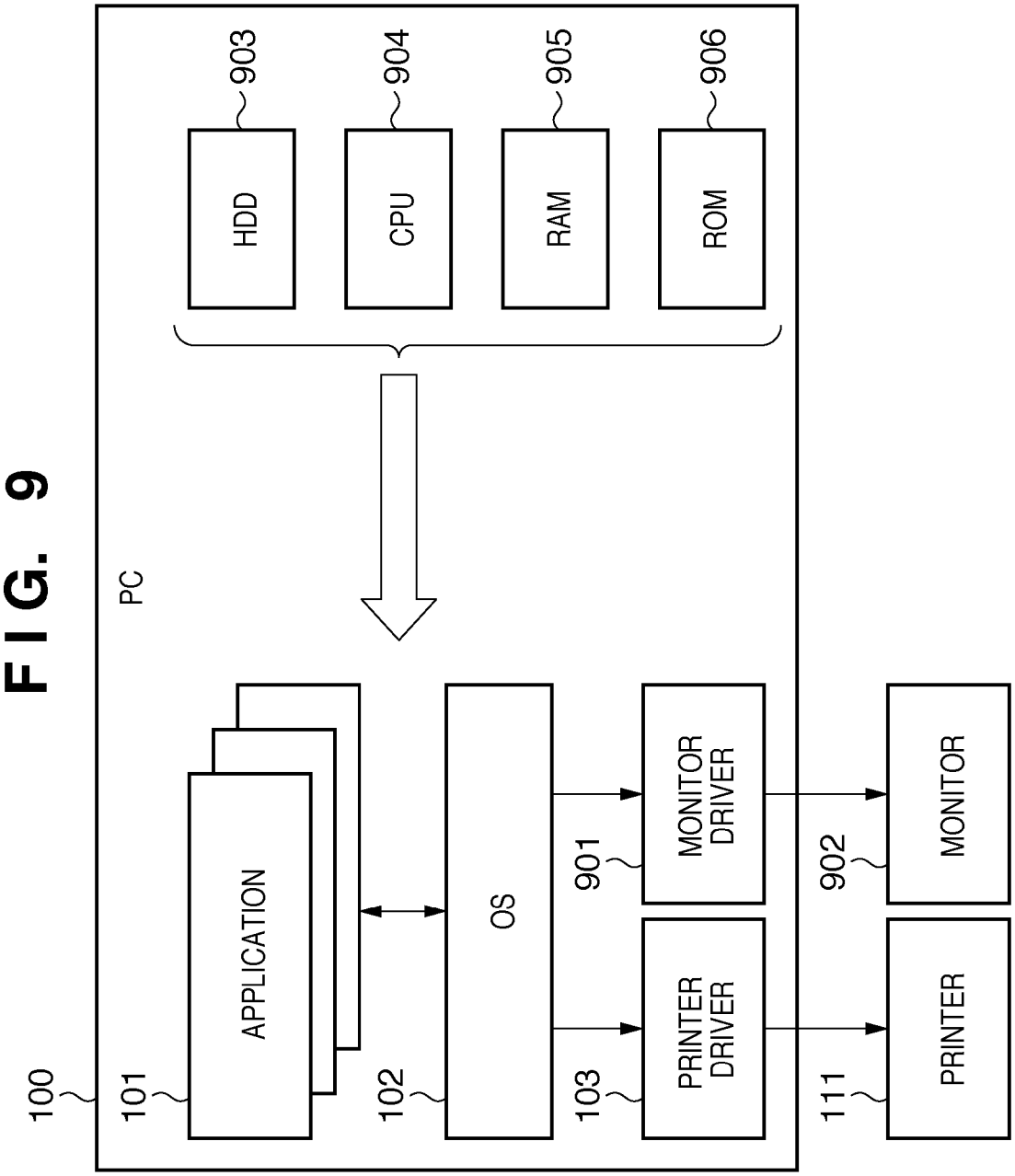
FIG. 9 is a block diagram showing an exemplary detailed configuration of a personal computer (PC) according to the first embodiment.

FIG. 9 is a block diagram showing an exemplary detailed configuration of the PC 100. In FIG. 9, the same reference numerals are attached to constituent elements that are the same as FIG. 8, and description thereof will be omitted. The PC 100 includes a hard disk drive (HDD) 903, a CPU 904, a RAM 905 and a ROM 906.

The HDD 903 includes computer programs of the OS, various applications, and the like. The functions of the application 101, the OS 102 and the printer driver 103 are realized as a result of the CPU 904 executing these programs.

The PC 100 further includes a monitor driver 901 that controls a monitor 902 connected to the PC 100. The function of the monitor driver 901 is also realized as a result of the CPU 904 executing a program stored in the HDD 903. The monitor driver 901 receives, via the OS 102, a rendering command group (image rendering command, text rendering command, and graphics rendering command) issued by the application 101, and displays an image based on the received rendering command group on the monitor 902. As aforementioned, the rendering command group issued by the application 101 is output to the printer driver 103 via the OS 102 during printing.

Figure 1:
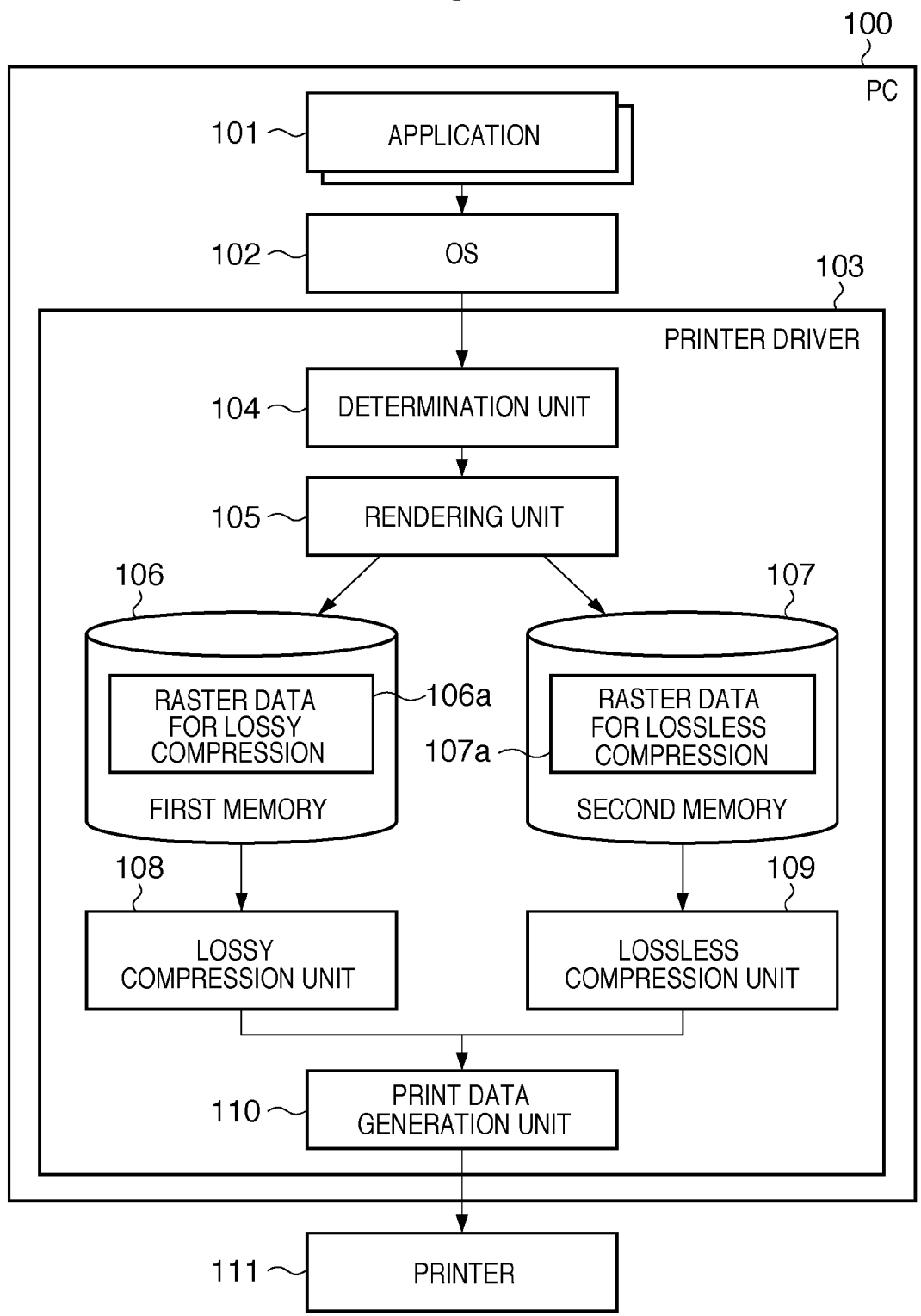
FIG. 1 is a block diagram showing an exemplary detailed configuration of a printer driver according to a first embodiment.

FIG. 1 is a block diagram showing an exemplary detailed configuration of the printer driver 103. The printer driver 103 includes a determination unit 104, a rendering unit 105, a lossy compression unit 108, a lossless compression unit 109 and a print data generation unit 110, which are realized by software for the printer driver 103. The printer driver 103 further includes a first memory 106 and a second memory 107, which are memories secured as part of the HDD 903 or the RAM 905 (see FIG. 9).

The printer driver 103 receives a rendering command group from the application 101 via the OS 102. The rendering command group includes a rendering command for a vector image.

The determination unit 104 determines, for each rendering command included in the rendering command group, whether ink having a predetermined property is to be used, in order for the printer 111 to print a corresponding raster image to a printing medium (paper, etc.). Here, ink having the predetermined property is, for example, ink whose permeability to the printing medium is at or above a threshold, or more specifically, color dye ink or the like. Hereinafter, to facilitate the description, it will be assumed that ink having the predetermined property is color dye ink, and ink not having the predetermined property is black pigment ink. That is, the printer 111 is provided with black pigment ink and color dye ink, with the color dye ink having a higher permeability to the printing medium than the black pigment ink.

Incidentally, the determination unit 104 is, in relation to a rendering command for a vector image, able to find out directly from the rendering command what colors are to be used with the corresponding raster image. In relation to a rendering command for a raster image, however, the determination unit 104 needs to check the pixels of the raster image in order to find out the colors to be used, which takes time. In view of this, the determination unit 104 may be configured to always determine for the rendering command of a raster image that ink (e.g., color dye ink) having the predetermined property is to be used. In other words, the determination unit 104 may always determine for the bitmap data described with reference to FIG. 8 that color dye ink is to be used. The determination process in the determination unit 104 can thereby be speeded up.

The rendering unit 105 renders raster images corresponding to respective rendering commands. At this time, the rendering unit 105 renders in the first memory 106 (in the first memory) a raster image corresponding to a rendering command for which it is determined in the determination unit 104 that color dye ink is to be used. The rendering unit 105 renders in the second memory 107 (in the second memory) a raster image corresponding to a rendering command for which it is determined in the determination unit 104 that color dye ink is not to be used. Accordingly, a raster image 106a in the first memory 106 and a raster image 107a in the second memory 107 are used by the printer 111 for printing to the same area of the printing medium.

In the present embodiment, only 2 bits per pixel need be secured in the second memory 107, since the only color to be printed using the black pigment ink is black. Accordingly, the required memory size and the data size to be transferred can be reduced. A plurality of binary raster images 107a may be generated for respective colors in the case where there is a plurality of colors for lossless compression, instead of creating a single piece of multi-value raster data. On the other hand, 24 bits per pixel, for example, are secured in the first memory 106, according to the resolution of the print target image.

After the rendering by the rendering unit 105 has ended, the lossy compression unit 108 lossily compresses the raster image 106a in the first memory 106 using JPEG encoding or the like. The lossless compression unit 109 losslessly compresses the raster image 107a in the second memory 107. Note that because it is important that the image is not contaminated by noise in the lossless compression unit 109, the raster image 107a need not be compressed in the case where, for instance, processing speed is prioritized over reducing the data size.

The print data generation unit 110 appends commands and the like required for processing in the printer 111 to the lossily compressed raster image 106a and the losslessly raster image 107a to generate print data. The data of the lossily compressed raster image 106a and the data of the losslessly raster image 107a are included alternately in the print data in raster count units, so as to be processable by the printer 111, for example.

The printer driver 103 outputs the print data generated as a result of the above processing to the printer 111. The printer 111 decompresses the compressed raster image data included in the received print data, combines the decompressed raster image data, and prints the composite image after performing color processing, binarization and the like thereon.

Figure 3:
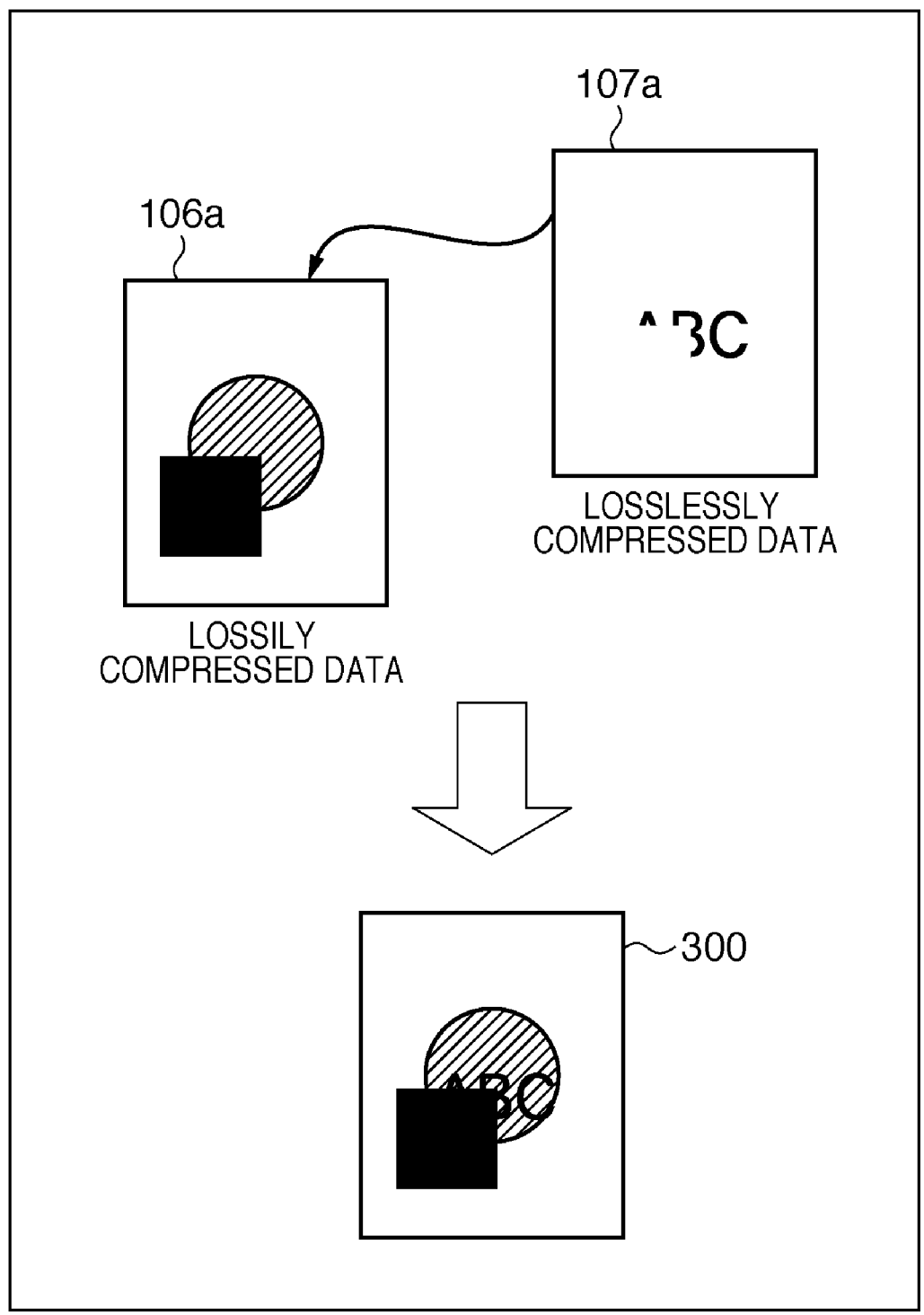
FIG. 3 shows examples of a raster image in a first memory, a raster image in a second memory, and a composite image obtained by combining these two images.

FIG. 3 shows examples of the raster image 106a in the first memory 106, the raster image 107a in the second memory 107, and a composite image 300 obtained by combining these two images.

The printer driver 103 of the present embodiment controls deterioration in print quality while reducing the data size of print data, by switching between lossless compression and lossy compression of raster data, based on the type of ink that will ultimately be used in printing in the printer 111. Here, the printer 111 is able to obtain the original print target image (composite image 300) simply by overlaying the losslessly raster image 107a on the lossily compressed raster image 106a.

Incidentally, when blank pixels occur due to part of an image such as a photo being clipped, the boundary of the blank pixels will be high frequency, causing noise contamination and a drop in the compression ratio during lossy compression. In view of this, in the present embodiment, the printer driver 103 performs rendering after dividing the raster image data between the first memory 106 and the second memory 107 at the point at which the raster image is rendered based on a rendering command received from the OS 102. That is, colors (pixels) to be losslessly compressed are not extracted after a raster image corresponding to a rendering command has been rendered in memory.

This makes it unnecessary to scan all pixels in the raster image and investigate the colors in pixel units, and enables the processing load to be suppressed. Further, the occurrence of blank pixels with extraction of specific pixels is prevented. This enables the compression process to be performed at a high compression ratio and with low noise, even in relation to raster images for lossy compression.

Further, in the case where raster images are simply rendered to respective memories and overlaid, the original hierarchical relation of the rendering commands is not maintained. Therefore, the area of the rendering command that is subsequently to be rendered on top needs to be clipped from the image being overlaid on top. The character string "ABC" of the raster image 107a is partially clipped for that reason. Conversely, when overlaying a lossily compressed image (raster image 106a) on top, part of the lossily compressed image needs to be clipped. An overlaying process such as this will not be employed in the following description, because it causes a drop in the compression ratio and increased noise, as aforementioned. However, employing such an overlaying process is not in itself contrary to the concept of the present invention. The high quality of the raster image 107a is maintained even if such an overlaying process is employed.

Processing for enabling the composite image 300 to be obtained with the simple overlay shown in FIG. 3 will be described below with reference to FIG. 6.

Figure 5:
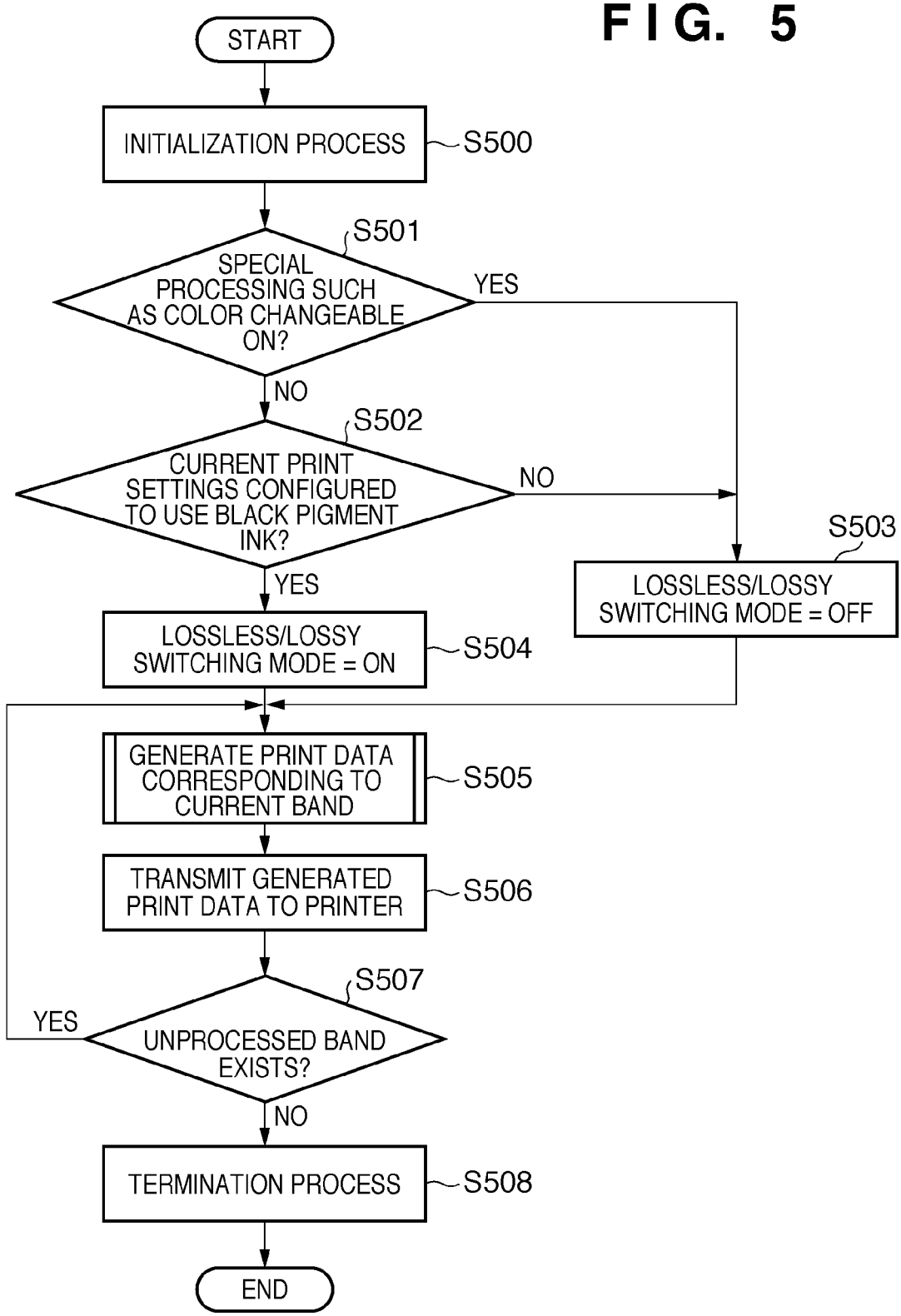
FIG. 5 is a flowchart showing the flow of a print data generating process according to the first embodiment.

Hereinafter, the above processing in the printer driver 103 will be described in detail, with reference FIG. 5. FIG. 5 is a flowchart showing the flow of a print data generating process according to the first embodiment. When the printer driver 103 receives a print request and a rendering command group from the OS 102, the processing of the flowchart shown in FIG. 5 commences.

In S500, the printer driver 103 performs an initialization process required for printing. In actual fact, the printer driver 103, as a result of the OS 102 calling a device driver interface (DDI) of the printer driver 103 in relation to the printer driver 103, performs appropriate processing according to the type of DDI called. Specifically, the printer driver 103 secures memory for rendering a raster image corresponding to a rendering command, for example. In the present embodiment, the first memory 106 is secured in S500, while the second memory 107 is secured in S605 of FIG. 6 described below.

Note that the printer driver 103 may process the rendering command group in processing units (band units) that include a plurality of rasters in the scan direction of the printhead of the printer 111. The memory size required by the PC 100 and the printer 111 is thereby reduced.

In S501, the printer driver 103 confirms the current print mode, and determines whether special processing is active. Special processing is processing that allows the type of ink used during printing to be changed, out of the image processing performed on a raster image rendered based on a rendering command. In the present embodiment, as aforementioned, the determination unit 104 determines whether color dye ink is to be used, based on the rendering command. However, when the type of ink to be used during printing changes after the raster image has been rendered, the determination result of the determination unit 104 can no longer be utilized. Therefore, if, in S501, the special processing is active, the processing proceeds to S503, where the printer driver 103 sets the lossless/lossy switching mode to OFF. If the lossless/lossy switching mode is OFF, all rendering commands are rendered to the first memory 106, as described below.

Note that the print mode may be preset in the RAM 905 or the like, or designated at the same time as the print request from the application 101. The ON/OFF of the lossless/lossy switching mode is set and held in the RAM 905 or the like.

If the special processing is not active, the printer driver 103, in S502, checks the current print mode, and determines whether black pigment ink has been set for use in printing black pixels (R=G=B=0 in RGB color space). Simply determining the color during rasterization is normally not enough to discriminate what ink was last used. Generally, the inks used in printing are appropriately differentiated by various print settings including the required printing speed and the print target paper. In the case of printing a photo image, for example, color dye ink is often also used in printing black pixels in order to improve image quality. If black pigment ink is not used in printing black pixels, the processing proceeds to S503, and the printer driver 103 sets the lossless/lossy switching mode to OFF. If black pigment ink is used in printing black pixels, the processing proceeds to S504, and the printer driver 103 sets the lossless/lossy switching mode to ON.

The determination in S502 is realized using the lookup table (LUT) shown in FIG. 4, for example. In the FIG. 4 example, whether or not black pigment ink is to be used is registered in the LUT, according to the combination of the printing medium, the duplex setting, the borderless setting and the print quality. In FIG. 4, the oblique lines indicate non-existent modes. In FIG. 4, "TRUE" modes are modes in which black pigment ink is used, and "FALSE" modes are modes in which black pigment ink is not used. In the present embodiment, the LUT needs only store TRUE or FALSE, as shown in FIG. 4, because only black pigment ink is focused on to find print settings according to which black pigment ink will be used. In the case of finding out for a plurality of inks whether a respective ink is used, TRUE or FALSE needs to be stored for each of the inks. Note that the LUT in FIG. 4 is stored in the HDD 903, as one part of the software for the printer driver 103, for example.

Subsequently, in S505, the printer driver 103 receives a rendering command from the OS 102 in band units, and generates print data that can be printed by the printer 111. This processing will be described in detail below with reference to the flowchart in FIG. 6.

In S506, the printer driver 103 transmits the generated print data to the printer 111. Thereafter the processing of S505 to S507 is repeated in band units until there are no more remaining bands.

Finally, in S508, the printer driver 103 performs a termination process such as freeing the first memory 106 secured in S500, and restores the processing to the OS 102, after which the processing of the present flowchart ends.

Note that while the printing process for one page is shown in the FIG. 5 flowchart, the processing of S501 to S507 is repeated for however many pages there are in the case where the print target image spans a plurality of pages.

Figure 6:
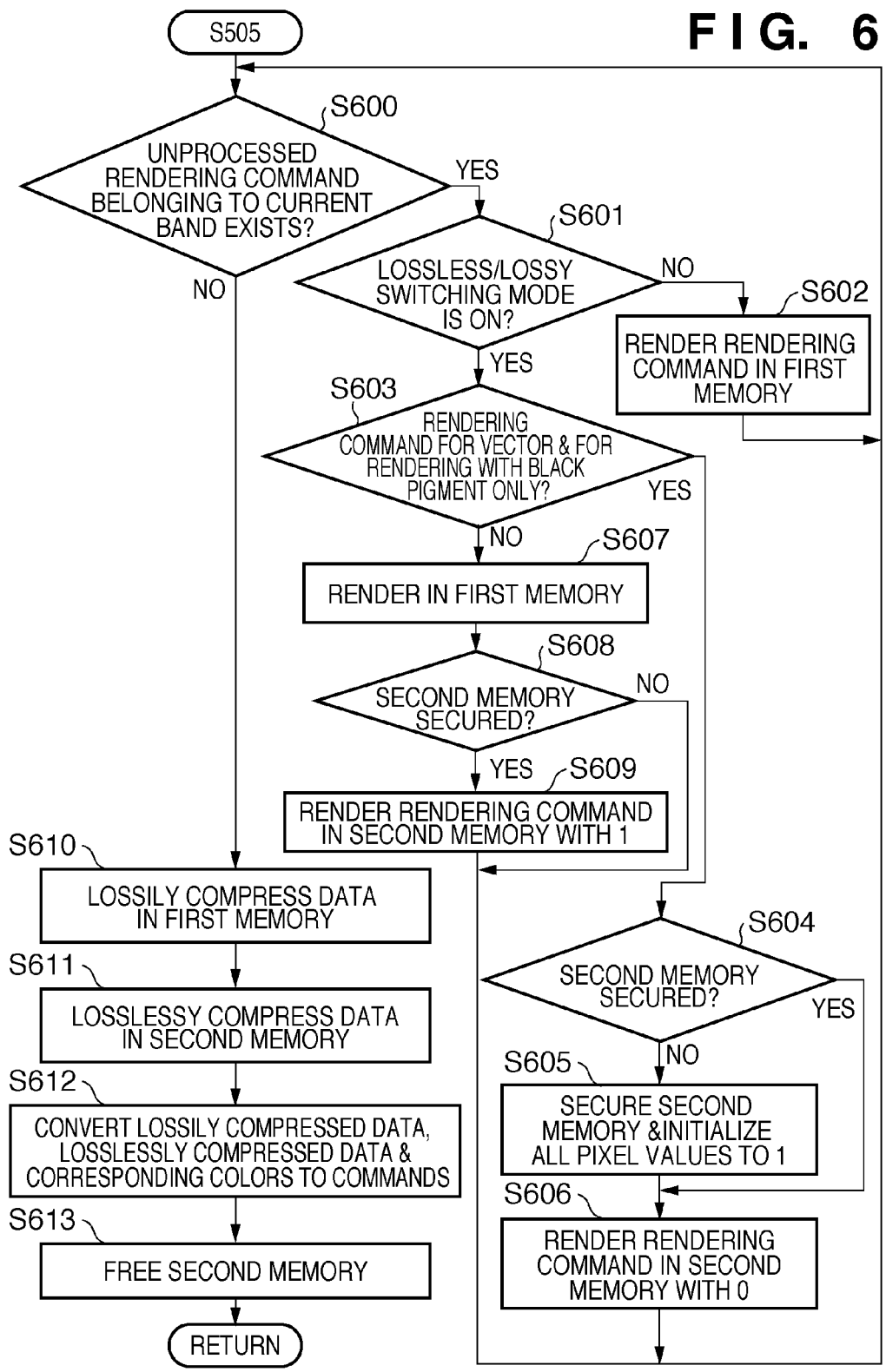
FIG. 6 is a flowchart showing the processing of S505 in FIG. 5 in detail.

FIG. 6 is a flowchart showing the processing of S505 in FIG. 5 in detail.

In S600, the printer driver 103 determines whether there are any unprocessed rendering commands belonging to the current band. Specifically, the OS 102 determines the rendering commands to be belonging to the current band, based on the size and position of the current band. The OS 102 then calls a DDI corresponding to the respective rendering command, and the printer driver 103 performs the processing of S601 onwards, according to the called DDI. When all rendering commands belonging to the current band are processed, the processing proceeds to S610.

In S601, the determination unit 104 checks the lossless/lossy switching mode set in S503 or S504 in FIG. 5. If the lossless/lossy switching mode is OFF, the processing proceeds to S602, where the rendering unit 105 renders a raster image corresponding to the rendering command in the first memory 106, and returns to S600. Note that the printer driver 103 may perform the rendering process using the function of the OS 102, instead of the rendering unit 105 (this similarly applies hereinafter).

On the other hand, if in S601 the lossless/lossy switching mode is ON, the determination unit 104, in S603, refers to the called DDI and the argument thereof, and determines whether the rendering command is to be printed with black pigment ink only. In the present embodiment, as aforementioned, a raster image to be printed with black pigment ink is rendered to the second memory 107 during rasterization based on a rendering command. At this time, it is possible, for example, to determine the black area (area in which R=0, G=0, B=0) in bitmap data based on a given rendering command, and perform rendering in the second memory 107. However, there is little likelihood of the extracted black area being high frequency, since bitmap data shows an image such as a photo, making it hardly worth performing the scanning and extracting process. Additionally, scanning bitmap data with a high bit count takes time. For the above reasons, in the present embodiment, only text data and graphics data to be rendered with only black pigment are developed in the second memory 107.

Here, a method of identifying text data and graphics data to be rendered with only black pigment will be described. A BRUSHOBJ structure is provided as an argument in the DDI of text data and graphics data. Information on the brush to be used in the rendering is stored in this structure. Here, whether or not to fill with one color can be judged by referring to an iSolidColor member in the BRUSHOBJ structure. The rendering color shown by BRUSHOBJ can be acquired with a BRUSHOBJ_ulGetBrushColor function. Whether the rendering command is to be rendered with only black pigment can be determined by determining whether the rendering color of the rendering command thereby acquired is RGB (0, 0, 0). Whether the rendering command is to be rendered with only black pigment can be determined using a method such as this in relation to rendering commands for graphics data, such as DrvLineTo, having a BRUSHOBJ structure as an argument.

DrvTextOut constituting a rendering command for text data has a BRUSHOBJ structure for permeation as an argument, in addition to a BRUSHOBJ structure for rendering. Whether permeation is defined in such a DDI by a BRUSHOBJ structure for permeation also needs to be investigated.

A BRUSHOBJ structure is also provided as an argument for DrvBitBlt, and the object to be filled can also be expressed. In this case, whether the rendering command is to be rendered with only black pigment can be judged by similarly investigating the rendering color shown by the BRUSHOBJ structure of the argument. The DDIs of other rendering commands such as DrvStretchBlt are excluded at this point, since filling with a BRUSHOBJ structure is not supported.

In S603, it is determined whether the rendering in the called DDI is with only black pigment, using a method such as the above. Here, if determined to be rendering with only black pigment, the processing proceeds to S604, while if this is not the case, the processing proceeds to S607.

In S604, the rendering unit 105 determines whether the second memory 107 has already been secured. If not yet secured, the rendering unit 105, in S605, secures the second memory 107 as a raster image memory in which each pixel is represented by 1 bit, and initializes all values to 1. That is, in the second memory 107, memory areas not rendered with a raster image are masked. Here, the secured memory need only be 1 bit per pixel, because the area is being saved for a specific color such as black pigment.

In S606, the rendering unit 105 renders in the second memory 107 a raster image corresponding to the rendering command. In the second memory 107, a "0"-bit is assumed to indicate a black pixel and a "1"-bit is assumed to indicate a white (transparent) pixel. Accordingly, rendering to the second memory 107 firstly involves newly creating a BRUSHOBJ in which the iSolidColor member is 0x00. Other arguments of the DDI such as area information or clipping information are employed without modification. That is, only the BRUSHOBJ structure is converted for use in the second memory 107 with respect to the arguments of the DDI, and rendering is subsequently performed after changing the rendering target to the second memory 107.

On the other hand, if determined in S603 that the rendering command is not to be printed with only black pigment ink, the rendering unit 105, in S607, renders a raster image corresponding to the rendering command in the first memory 106.

Next, in S608, the rendering unit 105 determines whether the second memory 107 has been secured. If secured, the rendering unit 105, in S609, performs a clipping process from the second memory 107. This clipping process is for obtaining the composite image 300 simply by overlaying the second memory 107 on the first memory 106 as described with reference to FIG. 3. That is, the memory area of the second memory 107 corresponding to the memory area of the first memory 106 rendered with a raster image is masked. Specifically, the rendering unit 105 newly creates a BRUSHOBJ for the second memory 107, and renders a raster image corresponding to the rendering command, with a similar method to S606. Here, because the raster image is to be rendered in the second memory 107 with 1 (transparent), firstly a BRUSH- OBJ whose iSolidColor is 0×01 is newly created. Other inputs of the DDI such as area information or clipping information are employed without modification, and rendered in the second memory 107.

Once the processing of S601 to S609 is completed for all rendering commands belonging to the current band, the processing proceeds to S610.

In S610, the lossy compression unit 108 lossily compresses the rasterized image data in the first memory 106. If necessary, the image data may be compressed after being further divided into strips, rather than compressing the image data for the entire band.

Next, in the case where the second memory 107 had been secured, the lossless compression unit 109, in S611, losslessly compresses the raster image in the second memory 107. As aforementioned, however, lossless compression need not be performed.

In S612, the print data generation unit 110 generates print data that includes the raster image data in the first memory 106 lossily compressed in S610, and the raster image data in the second memory 107 losslessly compressed in S611. Specifically, these pieces of raster image data are converted to commands in a format predetermined between the printer 111 and the printer driver 103.

Here, the losslessly compressed data and the lossily compressed data respectively generated in band units may be transmitted alternately after being respectively divided into strips, depending on the memory capacity of the printer 111. This is because the process of overlaying losslessly compressed data and lossily compressed data cannot be performed if the buffer in which data received by the printer 111 is developed is insufficient. Of course, the units in the case where the image data is divided into strips need to be the height (line count) of the respective compressed data when decompressed, and they are matched with both the losslessly compressed data and the lossily compressed data.

Figure 7:
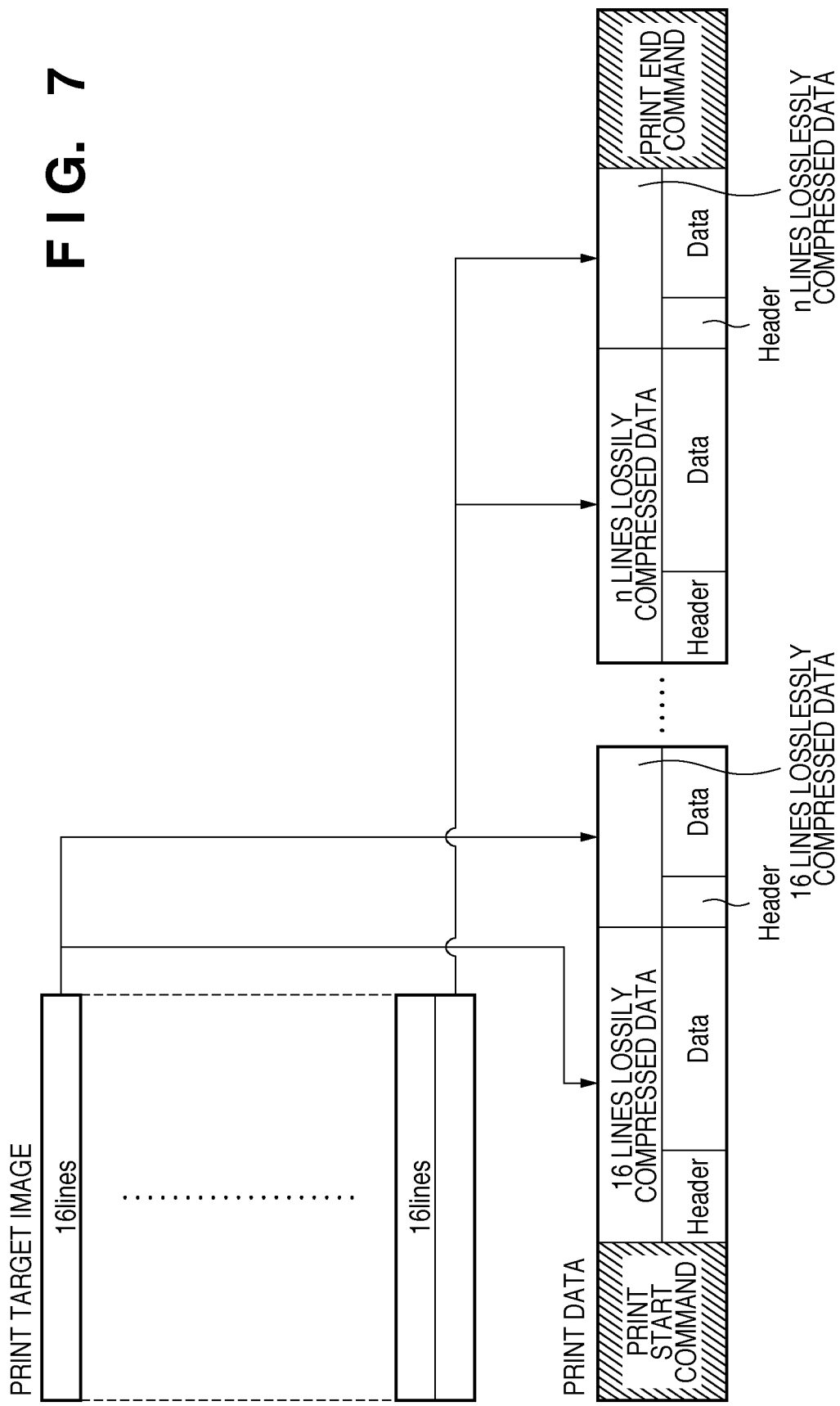
FIG. 7 shows exemplary print data according to the first embodiment.

Exemplary print data generated for the print target image of a given page is shown in FIG. 7. In the FIG. 7 example, the print data generation unit 110 converts the image for printing to a command every 16 lines, and transmits the commands to the printer 111. Firstly a print start command that includes print start and various initialization information is appended to the head of the print data. Next, as aforementioned, lossily compressed data and losslessly compressed data are alternately transmitted respectively as commands every 16 lines. The respective commands include information showing the line count (16, excluding the end of the page in FIG. 7), data size and the like as a header. A command showing print end is appended to the end of print data showing the last n lines of print image data.

When the print data for a specific band has been generated, the printer driver 103, in S613, frees the secured second memory 107. Hereinbefore, the process of generated print data in band units shown in S505 of FIG. 5 was described in detail.

According to the present embodiment, as described above, the PC 100 constituting an information processing apparatus provided with the printer driver 103 renders a raster image corresponding to a rendering command to be printed with black pigment ink having low permeability to a different memory (second memory 107) from other rendering commands. The raster image in the second memory 107 is transmitted to the printer 111 after being losslessly compressed (or without being compressed). On the other hand, the PC 100 renders a raster image corresponding to a rendering command to be printed with color dye ink in the first memory 106, and transmits the raster image in the first memory 106 to the printer 111 after lossily compressing the raster image. The printer 111 obtains image data for printing by respectively decompressing and overlaying the losslessly and lossily compressed raster images, as shown in FIG. 3.

Figure 2:
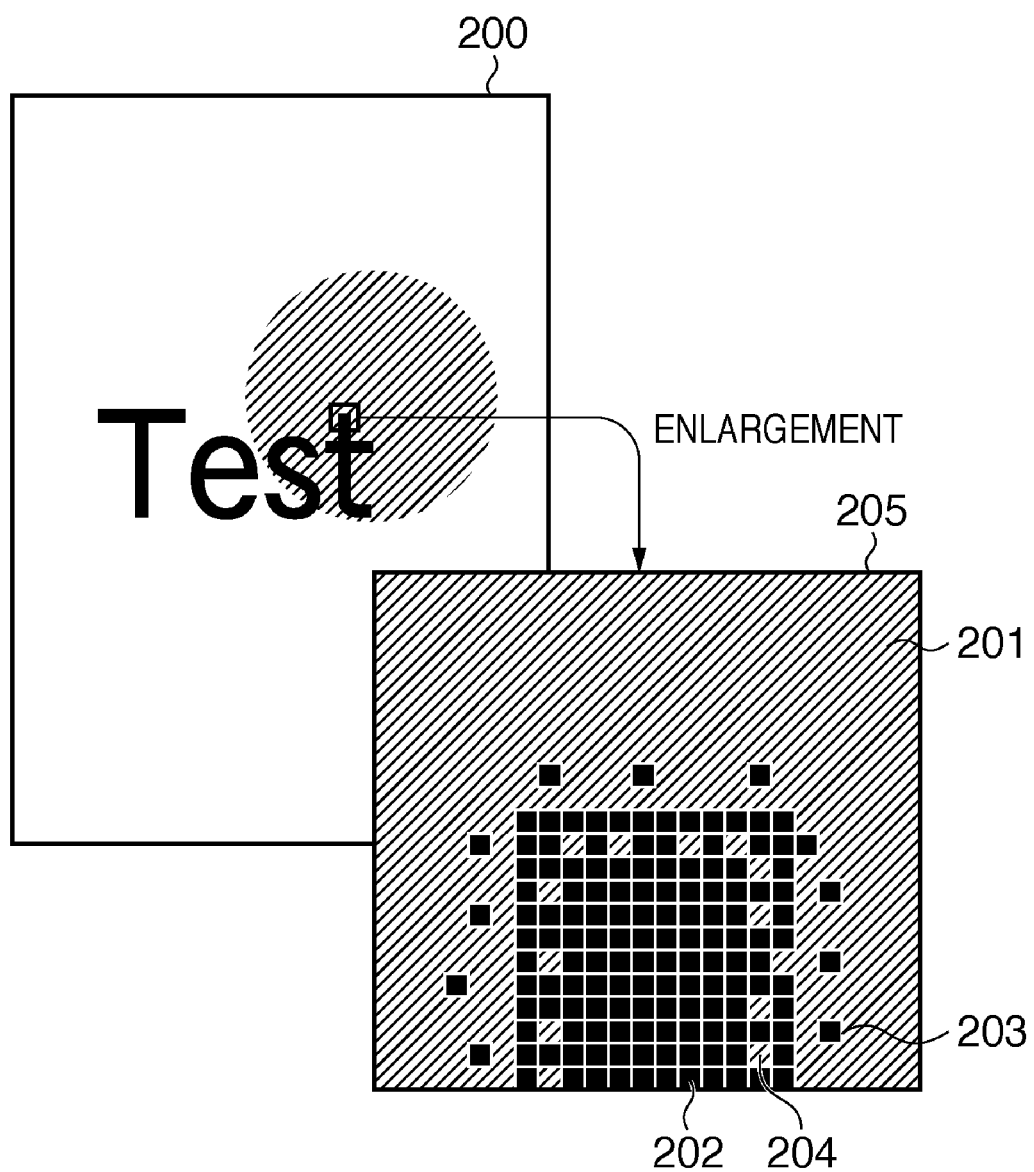
FIG. 2 illustrates a phenomenon where dye ink contaminates a character printed with pigment ink.

The image data for printing thus obtained is data in which noise generated in the area 202, as shown by the noise 204 in FIG. 2, has been suppressed for areas to be printed with low permeability black pigment. Therefore, bleeding induced by noise generated with lossy compression can be suppressed. That is, deterioration in print quality with use of inks with different properties during printing can be suppressed in an information processing apparatus that generates print data for printing by an inkjet printer. At this time, the area to be printed with high permeability color dye ink is lossily compressed, enabling increases in the data size transmitted from the PC 100 to the printer 111 to be suppressed, while at the same time suppressing deterioration in image quality.

Also, the occurrence of noise in the area 201, such as the noise 203 in FIG. 2, is suppressed and image quality improved.

MODIFIED EXAMPLE 1

In the above description, a single raster image for black pigment ink was rendered in the second memory 107, although a raster image rendered in the second memory 107 maybe in color or in plurality. In this case, the LUT shown in FIG. 4 stores use/non-use information on a plurality of colors. The printer driver 103 performs rendering to the second memory 107 if determined in S603 that a color determined to be shown as "use" in the LUT is to be rendered. The second memory 107 is secured for each color, and the raster image in the second memory 107 is transmitted to the printer 111 together with color information, and printed by the printer 111 after being combined with the raster image in the first memory 106.

MODIFIED EXAMPLE 2

Described above is a configuration in which the printer 111 inputs multi-value RGB data, at least a portion of which has been lossily compressed, irrespective of the print settings, although a configuration can also be adopted in which the printer 111 switches to input of uncompressed print data depending on the print settings.

In this case, for example, the printer driver 103 converts the multi-value RGB data to CMYK data without performing lossy conversion if the print settings indicate that compression is not to be performed, and transmits the CMYK data to the printer 111.

The print data thereby remains completely uncompressed throughout when the print settings indicate that print quality is to be prioritized, enabling a high-quality print result to be obtained.

MODIFIED EXAMPLE 3

In Modified Example 2, processing was switched between performing and not performing compression on print data to be transmitted to the printer 111 depending on the print settings. However, a configuration can also be adopted in which switching is performed depending on the interface used to connect the printer 111.

In this case, by transmitting compressed print data such as generated in the first embodiment only in the case of an interface with a slow transfer rate, fast printing can be performed even when connected using an interface with a slow transfer rate.

Other Embodiment

The processing described in the above embodiments may be realized by providing a storage medium, storing program codes of software realizing the above-described functions, to a computer system or apparatus. By reading the program codes stored in the storage medium with a computer (or a CPU or MPU) of the system or apparatus and executing them, the functions of the above-described embodiments can be realized. In this case, the program codes read from the storage medium realize the functions according to the embodiments, and the storage medium storing the program codes constitutes the invention. A storage medium, such as a floppy® disk, a hard disk, an optical disk, a magneto-optical disk and the like can be used for providing the program codes. Also, CD-ROM, CD-R, a magnetic tape, a non-volatile memory card, ROM, and the like can be used.

Furthermore, the functions according to the above embodiments are realized not only by executing the program codes read by the computer. The present invention also includes a case where an OS (operating system) or the like working on the computer performs part or the entire processes in accordance with designations of the program codes and realizes the functions according to the above embodiments.

Furthermore, the program codes read from the storage medium may be written in a function decompression card which is inserted into the computer or in a memory provided in a function decompression unit which is connected to the computer. Thereafter, a CPU or the like contained in the function decompression card or unit may perform part or the entire processes in accordance with designations of the program codes and may realize the functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-226695, filed on Aug. 31, 2007, which is hereby incorporated by reference herein in its entirety.

What is claimed is:

1. A printing system, comprising:
a printing apparatus capable of using one or more of a first type of ink and a second type of ink, whose permeability is lower than the first type of ink, and configured to decompress compressed image data; and
a print control apparatus configured to cause the printing apparatus to print an image, the print control apparatus comprising:
  a determination unit configured to determine whether the printing apparatus uses the second type of ink as well as the first type of ink or whether the printing apparatus uses the first type of ink without using the second type of ink, when the printing apparatus prints the image,
  an identification unit configured to, if it is determined by the determination unit that the printing apparatus uses the second type of ink as well as the first type of ink, identify a first area and a second area of the image based on information representing the image, where the first area is an area to be printed by the printing apparatus using the first type of ink and the second area is an area to be printed by the printing apparatus using the second type of ink,
  a compression unit configured to:
    (i) lossily compress image data of the first area and losslessly compress image data of the second area, if it is determined by the determination unit that the printing apparatus uses the second type of ink as well as the first type of ink, and
    (ii) lossily compress image data corresponding to the image to be printed by the printing apparatus, if it is determined by the determination unit that the printing apparatus uses the first type of ink without using the second type of ink, and
  a print control unit configured to send the image data compressed by the compression unit to the printing apparatus,
wherein the printing apparatus decompresses the compressed image data and prints the image according to the decompressed image data.

2. The printing system according to claim 1, wherein the image data corresponding to the image to be printed by the printing apparatus includes a plurality of objects, and the identification unit identifies the first area and the second area for areas which correspond to each of the plurality of objects.

3. The printing system according to claim 1, wherein the print control unit further comprises:
a transmission unit configured to transmit the image data of the first area and the image data of the second area compressed by the compression unit to the printing apparatus such that the image data of the first area and the image data of the second area can be distinguished from each other.

4. The printing system according to claim 1, wherein the identification unit identifies the first area and the second area based on colors represented by the image to be printed by the printing apparatus.

5. The printing system according to claim 1, wherein the image data corresponding to the image to be printed by the printing apparatus includes a plurality of objects, and the identification unit identifies the first area and the second area based on whether each of the plurality of objects is a text or a raster image.

6. The printing system according to claim 1, wherein the determination unit determines whether or not the printing apparatus uses the second type of ink based on a print setting indicating a setting to be used when causing the printing apparatus to print the image.

7. The printing system according to claim 1, wherein the first type of ink is dye ink and the second type of ink is pigment ink.

8. A method for causing a printing apparatus to print an image, the printing apparatus being capable of using one or more of a first type of ink and a second type of ink, whose permeability is lower than the first type of ink, the method comprising:
a determination step of determining whether the printing apparatus uses the second type of ink as well as the first type of ink or whether the printing apparatus uses the first type of ink without using the second type of ink, when the printing apparatus prints the image;
an identification step of, if it is determined in the determination step that the printing apparatus uses the second type of ink as well as the first type of ink, identifying a first area and a second area of the image based on information representing the image, where the first area is an area to be printed by the printing apparatus by use of the first type of ink and the second area is an area to be printed by the printing apparatus by use of the second type of ink;

a compression step of (i) lossily compressing image data of the first area and losslessly compressing image data of the second area, if it is determined in the determination step that the printing apparatus uses the second type of ink as well as the first type of ink, and (ii) lossily compressing image data corresponding to the image to be printed by the printing apparatus, if it is determined in the determination step that the printing apparatus uses the first type of ink without using the second type of ink; and a print control step of sending the image data compressed in the compression step to the printing apparatus, wherein the printing apparatus decompresses the compressed image data and prints the image according to the decompressed image data.

9. The method according to claim 8, wherein the image data corresponding to the image to be printed by the printing apparatus includes a plurality of objects, and each of the first area and the second area correspond to each of the plurality of objects.

10. The method according to claim 8, further comprising:
a transmission step of transmitting the compressed image data of the first area and the compressed image data of the second area to the printing apparatus such that the compressed image data of the first area and the compressed image data of the second area can be distinguished from each other.

11. The method according to claim 8, wherein the first area and the second area are identified based on colors represented by the image to be printed by the printing apparatus.

12. The method according to claim 8, wherein the image data corresponding to the image to be printed by the printing apparatus includes a plurality of objects, and the first area and the second area are identified based on whether each of the plurality of objects is a text or a raster image.

13. The method according to claim 8, wherein it is determined whether or not the printing apparatus uses the second type of ink based on a print setting indicating a setting to be used when causing the printing apparatus to print the image.

14. The method according to claim 8, wherein the first type of ink is dye ink and the second type of ink is pigment ink.

* * * * *